United States Patent
Tsuchida

(10) Patent No.: US 9,682,696 B2
(45) Date of Patent: Jun. 20, 2017

(54) HYBRID VEHICLE

(71) Applicant: TOYOTA JIDOSHA KABUSHIKI KAISHA, Toyota-shi, Aichi-ken (JP)

(72) Inventor: Yasutaka Tsuchida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/047,741

(22) Filed: Feb. 19, 2016

(65) Prior Publication Data

US 2016/0244047 A1 Aug. 25, 2016

(30) Foreign Application Priority Data

Feb. 23, 2015 (JP) .................................. 2015-32973

(51) Int. Cl.
*B60W 20/16* (2016.01)
*B60K 6/365* (2007.10)
*B60W 10/06* (2006.01)
*B60W 10/08* (2006.01)
*B60K 6/26* (2007.10)

(52) U.S. Cl.
CPC ............... *B60W 20/16* (2016.01); *B60K 6/26* (2013.01); *B60K 6/365* (2013.01); *B60W 10/06* (2013.01); *B60W 10/08* (2013.01); B60K 2006/268 (2013.01); B60W 2510/0685 (2013.01); B60W 2710/083 (2013.01); B60Y 2200/92 (2013.01); B60Y 2300/188 (2013.01); B60Y 2300/60 (2013.01); B60Y 2400/46 (2013.01); B60Y 2400/61 (2013.01); B60Y 2400/73 (2013.01); Y02T 10/6239 (2013.01); Y02T 10/6286 (2013.01); Y02T 10/7077 (2013.01); Y10S 903/91 (2013.01)

(58) Field of Classification Search
CPC ...... B60W 20/16; B60W 10/06; B60W 10/08; B60W 2510/0685; B60W 2710/083; B60K 6/26; B60K 6/365; B60K 2006/268; B60Y 2200/92; B60Y 2300/188; B60Y 2400/46; B60Y 2400/61; B60Y 2400/73; Y10S 903/91
USPC ................................. 701/22, 113; 180/65.2
See application file for complete search history.

(56) References Cited

U.S. PATENT DOCUMENTS

2013/0179055 A1* 7/2013 Kato ........................ B60K 6/48
701/113

FOREIGN PATENT DOCUMENTS

JP 2014-104909 6/2014

* cited by examiner

*Primary Examiner* — Marthe Marc-Coleman
(74) *Attorney, Agent, or Firm* — Finnegan, Henderson, Farabow, Garrett & Dunner, LLP

(57) ABSTRACT

In the process of cranking and starting an engine by a motor, until a predetermined condition is satisfied, i.e., until a rotation speed Ne of the engine is equal to or higher than a predetermined rotation speed Nstmg and a crank angle θcr of the engine is in a predetermined range of θst1 to θst2, the motor is controlled to increase the torque of the motor from value 0 to a positive specified torque Tst1 and keep the torque of the motor at the specified torque Tst1 by a rate process using a rate value ΔTst1. When the predetermined condition is satisfied, a rate value ΔTst2 is set to increase with an increase in satisfaction time rotation speed Neset that denotes the rotation speed Ne of the engine on satisfaction of the predetermined condition. The motor is then controlled to decrease the torque of the motor from the specified torque Tst1 by a rate process using a rate value ΔTst2.

6 Claims, 12 Drawing Sheets

HYBRID VEHICLE

This application claims priority to Japanese Patent Application No. 2015-32973 filed 23 Feb. 2015, the contents of which is incorporated herein by reference.

TECHNICAL FIELD

The present invention relates to a hybrid vehicle or more specifically relates to a hybrid vehicle equipped with an engine, a motor and a battery.

BACKGROUND ART

A proposed configuration of a hybrid vehicle includes an engine, a planetary gear, first and second motors and a battery (for example, Patent Literature 1). The planetary gear includes a sun gear that is connected with a rotor of the first motor. The planetary gear includes a carrier that is connected with a crankshaft of the engine via a damper. The planetary gear includes a ring gear that is connected with a driveshaft linked with drive wheels and a rotor of the second motor. In this hybrid vehicle, in the process of cranking and starting the engine by the first motor, until both a rotation speed condition that the rotation speed of the engine is equal to or higher than a predetermined rotation speed and a crank angle condition that the crank angle of the engine is in a predetermined range are satisfied, the first motor is controlled to increase the torque of the first motor from value 0 to a positive specified torque by a rate process using a first rate value. After both the rotation speed condition and the crank angle condition are satisfied, the first motor is controlled to decrease the torque of the first motor from the positive specified torque by a rate process using a second rate value. This suppresses the occurrence of significantly large vibration in the process of starting the engine.

CITATION LIST

Patent Literature

Patent Literature 1: JP 2014-104909A

SUMMARY OF INVENTION

Technical Problem

The hybrid vehicle described above uses a predetermined value (fixed value) as the second rate value. This causes the time period between start of cranking the engine by the first motor and completion of starting the engine (entire starting time period) and the rotation amount of the engine (number of strokes of intake, compression, expansion and exhaust, i.e., total emission) in the entire starting time period to be varied according to the timing when both the rotation speed condition and the crank angle condition are satisfied. This is likely to cause deterioration of drivability (acceleration performance) and emission.

With regard to the hybrid vehicle, an object of the invention is to suppress deterioration of drivability and emission.

Solution to Problem

In order to solve at least part of the problems described above, the hybrid vehicle of the invention may be implemented by the following aspects or configurations.

According to one aspect of the invention, there is provided a first hybrid vehicle including: an engine that is configured to have an output shaft that is connected via a torsion element with a downstream shaft linked with an axle; a motor that is configured to input and output power from and to the downstream shaft; a battery that is configured to transmit electric power to and from the motor; and a controller that is configured to, in a process of cranking and starting the engine by the motor, control the motor such as to increase a torque of the motor from value 0 to a specified torque and keep the torque at the specified torque until a predetermined condition is satisfied that a rotation speed of the engine is equal to or higher than a predetermined rotation speed and a crank angle of the engine is in a predetermined crank angle range, and to control the motor such as to decrease the torque of the motor from the specified torque after the predetermined condition is satisfied, wherein after the predetermined condition is satisfied, the controller controls the motor such as to decrease the torque of the motor at a higher rate with an increase in rotation speed or rotational acceleration of the engine at a time when the predetermined condition is satisfied.

The first hybrid vehicle of the above aspect controls the motor in the following manner in the process of cranking and starting the engine by the motor. Until the predetermined condition is satisfied, i.e., until the rotation speed of the engine is equal to or higher than the predetermined rotation speed and the crank angle of the engine is in the predetermined crank angle range, the motor is controlled to increase the torque of the motor from the value 0 to the specified torque and keep the torque of the motor at the specified torque. After the predetermined condition is satisfied, the motor is controlled to decrease the torque of the motor from the specified torque. In this process of controlling the motor, after the predetermined condition is satisfied, the motor is controlled to decrease the torque of the motor at a higher rate with an increase in rotation speed or rotational acceleration of the engine at the time when the predetermined condition is satisfied. This configuration suppresses the vibration of the vehicle caused by the torsion element in the course of decreasing the torque of the motor. The configuration of decreasing the torque of the motor at the higher rate with an increase in rotation speed or rotational acceleration of the engine at the time when the predetermined condition is satisfied suppresses variations of the time period between start of cranking the engine by the motor and completion of starting the engine (entire starting time period) and the rotation amount of the engine (number of strokes of intake, compression, expansion and exhaust, i.e., total emission) in the entire starting time period. This results in suppressing deterioration of drivability (acceleration performance) and emission.

According to another aspect of the invention, there is provided a second hybrid vehicle including: an engine that is configured to have an output shaft that is connected via a torsion element with a downstream shaft linked with an axle; a motor that is configured to input and output power from and to the downstream shaft; a battery that is configured to transmit electric power to and from the motor; and a controller that is configured to, in a process of cranking and starting the engine by the motor, control the motor such as to increase a torque of the motor from value 0 to a specified torque and keep the torque at the specified torque until a predetermined condition is satisfied that a rotation speed of the engine is equal to or higher than a predetermined rotation speed and a crank angle of the engine is in a predetermined crank angle range, and to control the motor such as to decrease the torque of the motor from the specified torque after the predetermined condition is satisfied, wherein after the predetermined condition is satisfied, the controller controls the motor such as to decrease the torque of the motor at a higher rate with an increase in time period between start of cranking the engine and satisfaction of the predetermined condition.

The second hybrid vehicle of the above aspect controls the motor in the following manner in the process of cranking and starting the engine by the motor. Until the predetermined condition is satisfied, i.e., until the rotation speed of the engine is equal to or higher than the predetermined rotation speed and the crank angle of the engine is in the predetermined crank angle range, the motor is controlled to increase the torque of the motor from the value 0 to the specified torque and keep the torque of the motor at the specified torque. After the predetermined condition is satisfied, the motor is controlled to decrease the torque of the motor from the specified torque. In this process of controlling the motor, after the predetermined condition is satisfied, the motor is controlled to decrease the torque of the motor at a higher rate with an increase in time period between start of cranking the engine and satisfaction of the predetermined condition. This configuration suppresses the vibration of the vehicle caused by the torsion element in the course of decreasing the torque of the motor. The configuration of decreasing the torque of the motor at the higher rate with an increase in time period between start of cranking the engine and satisfaction of the predetermined condition suppresses variations of the time period between start of cranking the engine by the motor and completion of starting the engine (entire starting time period) and the rotation amount of the engine (number of strokes of intake, compression, expansion and exhaust, i.e., total emission) in the entire starting time period. This results in suppressing deterioration of drivability (acceleration performance) and emission.

According to another aspect of the invention, there is provided a third hybrid vehicle including: an engine that is configured to have an output shaft that is connected via a torsion element with a downstream shaft linked with an axle; a motor that is configured to input and output power from and to the downstream shaft; a battery that is configured to transmit electric power to and from the motor; and a controller that is configured to, in a process of cranking and starting the engine by the motor, control the motor such as to increase a torque of the motor from value 0 to a specified torque and keep the torque at the specified torque until a predetermined condition is satisfied that a rotation speed of the engine is equal to or higher than a predetermined rotation speed and a crank angle of the engine is in a predetermined crank angle range, and to control the motor such as to decrease the torque of the motor from the specified torque after the predetermined condition is satisfied, wherein after the predetermined condition is satisfied, the controller controls the motor such as to decrease the torque of the motor at a higher rate with an increase in time period between increase of the torque of the motor to the specified torque and satisfaction of the predetermined condition.

The third hybrid vehicle of the above aspect controls the motor in the following manner in the process of cranking and starting the engine by the motor. Until the predetermined condition is satisfied, i.e., until the rotation speed of the engine is equal to or higher than the predetermined rotation speed and the crank angle of the engine is in the predetermined crank angle range, the motor is controlled to increase the torque of the motor from the value 0 to the specified torque and keep the torque of the motor at the specified torque. After the predetermined condition is satisfied, the motor is controlled to decrease the torque of the motor from the specified torque. In this process of controlling the motor, after the predetermined condition is satisfied, the motor is controlled to decrease the torque of the motor at a higher rate with an increase in time period between increase of the torque of the motor to the specified torque and satisfaction of the predetermined condition. This configuration suppresses the vibration of the vehicle caused by the torsion element in the course of decreasing the torque of the motor. The configuration of decreasing the torque of the motor at the higher rate with an increase in time period between increase of the torque of the motor to the specified torque and satisfaction of the predetermined condition suppresses variations of the time period between start of cranking the engine by the motor and completion of starting the engine (entire starting time period) and the rotation amount of the engine (number of strokes of intake, compression, expansion and exhaust, i.e., total emission) in the entire starting time period. This results in suppressing deterioration of drivability (acceleration performance) and emission.

DESCRIPTION OF EMBODIMENTS

The following describes some aspects of the invention with reference to embodiments.

Figure 1:
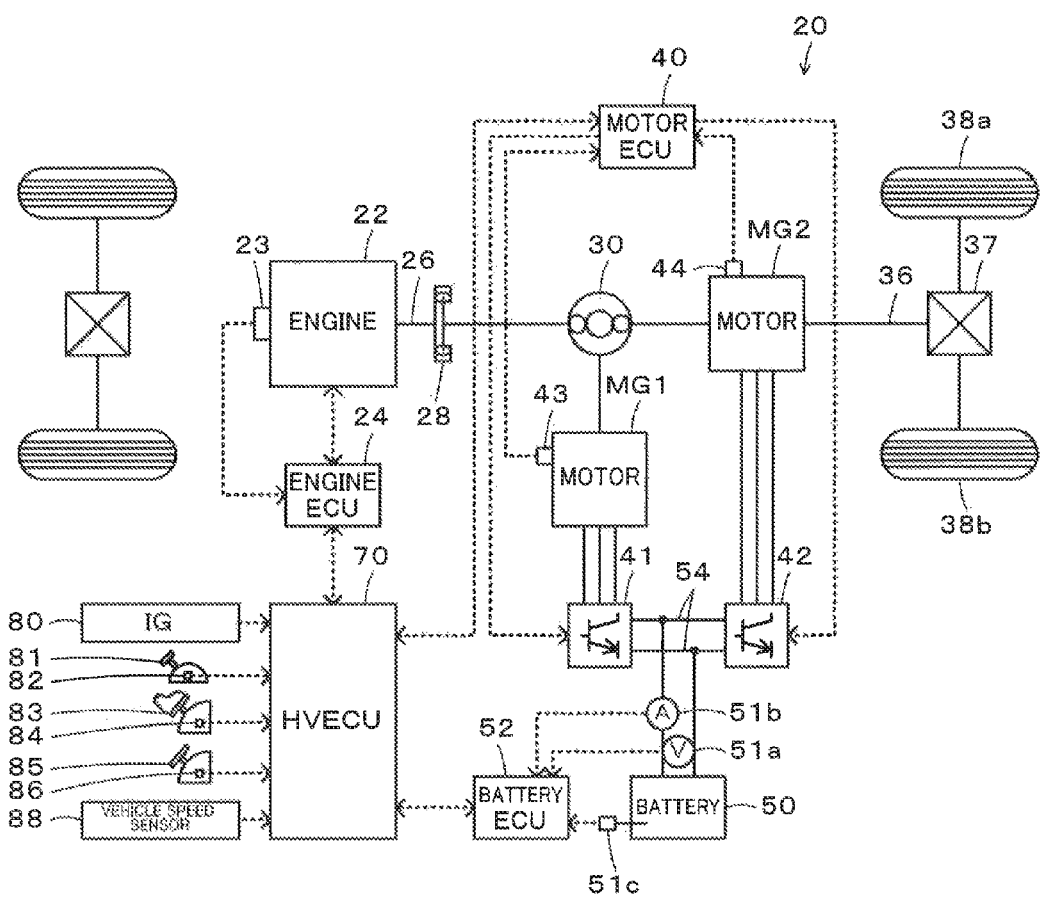
FIG. 1 is a configuration diagram illustrating the schematic configuration of a hybrid vehicle according to one embodiment of the invention.

FIG. 1 is a configuration diagram illustrating the schematic configuration of a hybrid vehicle 20 according to one embodiment of the invention. As illustrated, the hybrid vehicle 20 of the embodiment includes an engine 22, a planetary gear 30, motors MG1 and MG2, inverters 41 and 42, a battery 50, and a hybrid electronic control unit (hereinafter referred to as HVECU) 70.

The engine 22 is configured as a four-cylinder internal combustion engine that uses, for example, gasoline or light oil as fuel to output power. This engine 22 is operated and controlled by an engine electronic control unit (hereinafter referred to as "engine ECU") 24.

The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals from various sensors required for operation control of the engine 22. The signals from various sensors include, for example, a crank angle θcr from a crank position sensor 23 configured to detect the rotational position of a crankshaft 26 of the engine 22 and a throttle position TH from a throttle valve position sensor configured to detect the position of a throttle valve. The engine ECU 24 outputs, via its output port, various control signals for operation control of the engine 22. The various control signals include, for example, a control signal to a fuel injection valve, a control signal to a throttle motor configured to adjust the position of the throttle valve and a control signal to an ignition coil integrated with an igniter. The engine ECU 24 is connected with the HVECU 70 via the respective communication ports. The engine ECU 24 performs operation control of the engine 22, in response to control signals from the HVECU 70. The engine ECU 24 also outputs data regarding the operating conditions of the engine 22 to the HVECU 70 as appropriate. The engine ECU 24 computes a rotation speed Ne of the engine 22, based on the crank angle θcr from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 38a and 38b via a differential gear 37 and is connected with a rotor of the motor MG2. The planetary gear 30 also includes a carrier that is connected with the crankshaft 26 of the engine 22 via a damper 28 as torsion element.

The motor MG1 is configured, for example, as a synchronous motor generator. The motor MG1 includes the rotor that is connected with the sun gear of the planetary gear 30 as described above. The motor MG2 is also configured, for example, as a synchronous motor generator. The motor MG2 includes the rotor that is connected with the driveshaft 36 as described above. The inverters 41 and 42 as well as the battery 50 are connected with power lines 54. The motors MG1 and MG2 are rotated and driven by switching control of a plurality of switching elements (not shown) of the inverters 41 and 42 by a motor electronic control unit (hereinafter referred to as "motor ECU") 40.

The motor ECU 40 is implemented by a CPU-based microprocessor and includes a ROM that stores processing programs, a RAM that temporarily stores data, input and output ports and a communication port other than the CPU, although not being illustrated. The motor ECU 40 inputs, via its input port, signals from various sensors required for drive control of the motors MG1 and MG2. The signals from various sensors include, for example, rotational positions θm1 and θm2 from rotational position detection sensors 43 and 44 configured to detect the rotational positions of the rotors of the motors MG1 and MG2 and phase currents from current sensors configured to detect electric currents flowing through the respective phases of the motors MG1 and MG2. The motor ECU 40 outputs, via its output port, for example, switching control signals to the switching elements (not shown) of the inverters 41 and 42. The motor ECU 40 is connected with the HVECU 70 via the respective communication ports. The motor ECU 40 performs drive control of the motors MG1 and MG2 in response to control signals from the HVECU 70. The motor ECU 40 also outputs data regarding the driving conditions of the motors MG1 and MG2 to the HVECU 70 as appropriate. The motor ECU 40 computes rotation speeds Nm1 and Nm2 of the motors MG1 and MG2, based on the rotational positions θm1 and θm2 of the rotors of the motors MG1 and MG2 from the rotational position detection sensors 43 and 44.

The battery 50 is configured, for example, as a lithium ion secondary battery or a nickel hydride secondary battery. This battery 50 as well as the inverters 41 and 42 is connected with the power lines 54 as described above. The battery 50 is under management of a battery electronic control unit (hereinafter referred to as "battery ECU") 52.

The battery ECU 52 is implemented by a CPU-based microprocessor and includes a ROM that stores processing programs, a RAM that temporarily stores data, input and output ports and a communication port other than the CPU, although not being illustrated. The battery ECU 52 inputs, via its input port, signals from various sensors required for management of the battery 50. The signals from various sensors include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50. The battery ECU 52 is connected with the HVECU 70 via the respective communication ports. The battery ECU 52 outputs data regarding the conditions of the battery 50 to the HVECU 70 as appropriate. The battery ECU 52 computes a state of charge SOC, based on an integrated value of the battery current Ib from the current sensor 51b. The state of charge SOC denotes a ratio of power capacity dischargeable from the battery 50 to the entire capacity of the battery 50. The battery ECU 52 also computes input and output limits Win and Wout, based on the computed state of charge SOC and the battery temperature Tb from the temperature sensor 51c. The input and output limits Win and Wout denote maximum allowable electric powers chargeable into and dischargeable from the battery 50.

The HVECU 70 is implemented by a CPU-based microprocessor and includes a ROM that stores processing programs, a RAM that temporarily stores data, input and output ports and a communication port other than the CPU, although not being illustrated. The HVECU 70 inputs, via its input port, signals from various sensors. The signals from various sensors include, for example, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85, and a vehicle speed V from a vehicle speed sensor 88. As described above, the HVECU 70 is connected with the engine ECU 24, the motor ECU 40 and the battery ECU 52 via the communication ports. The HVECU 70 transmits various control signals and data to and from the engine ECU 24, the motor ECU 40 and the battery ECU 52.

The hybrid vehicle 20 of the embodiment having the above configuration runs in a drive mode, such as hybrid drive mode (HV drive mode) or an electric drive mode (EV drive mode). The HV drive mode denotes a drive mode in which the hybrid vehicle 20 is driven with operation of the engine 22. The EV drive mode denotes a drive mode in which the hybrid vehicle 20 is driven with stopping operation of the engine 22.

In the HV drive mode, the HVECU 70 first sets a required torque Tr* required for running (to be output to the driveshaft 36), based on the accelerator position Acc from the accelerator pedal position sensor 84 and the vehicle speed V from the vehicle speed sensor 88. The HVECU 70 subsequently multiplies the set required torque Tr* by a rotation speed Nr of the driveshaft 36 to calculate a driving power Pdrv* required for running. The rotation speed Nr of the driveshaft 36 used herein may be the rotation speed Nm2 of the motor MG2 or a rotation speed calculated by multiplying the vehicle speed V by a conversion efficiency. The HVECU 70 subtracts a charge-discharge power demand Pb* of the battery 50 (that takes a positive value in the case of discharging from the battery 50) from the driving power Pdrv* to calculate a required power Pe* required for the vehicle. The HVECU 70 then sets a target rotation speed Ne* and a target torque Te* of the engine 22 and torque commands Tm1* and Tm2* of the motors MG1 and MG2 such as to cause the required power Pe* to be output from the engine 22 and cause the required torque Tr* to be output to the driveshaft 36 within the range of the input and output limits Win and Wout of the battery 50. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs intake air flow control, fuel injection control and ignition control of the engine 22 so as to operate the engine 22 based on the received target rotation speed Ne* and the received target torque Te*. When receiving the torque commands Tm1* and Tm2* of the motors MG1 and MG2, the motor ECU 40 performs switching control of the switching elements of the inverters 41 and 42 so as to drive the motors MG1 and MG2 with the torque commands Tm1* and Tm2*. When a stop condition of the engine 22 is satisfied in the HV drive mode, for example, when the required power Pe* becomes equal to or less than a stop threshold value Pstop, the hybrid vehicle 20 stops operation of the engine 22 and shifts the drive mode to the EV drive mode.

In the EV drive mode, the HVECU 70 first sets the required torque Tr*, as in the case of the HV drive mode. The HVECU 70 subsequently sets the torque command Tm1* of the motor MG1 to value 0. The HVECU 70 sets the torque command Tm2* of the motor MG2 such as to output the required torque Tr* to the driveshaft 36 in the range of the input limit Win and the output limit Wout of the battery 50. The HVECU 70 then sends the torque commands Tm1* and Tm2* of the motors MG1 and MG2 to the motor ECU 40. When receiving the torque commands Tm1* and Tm2* of the motors MG1 and MG2, the motor ECU 40 performs switching control of the switching elements of the inverters 41 and 42 so as to drive the motors MG1 and MG2 with the torque commands Tm1* and Tm2*. When a start condition of the engine 22 is satisfied in the EV drive mode, for example, when the required power Pe* calculated as in the HV drive mode becomes equal to or greater than a start threshold value Pstart that is larger than the stop threshold value Pstop, the hybrid vehicle 20 starts operation of the engine 22 and shifts the drive mode to the HV drive mode.

Figure 2:
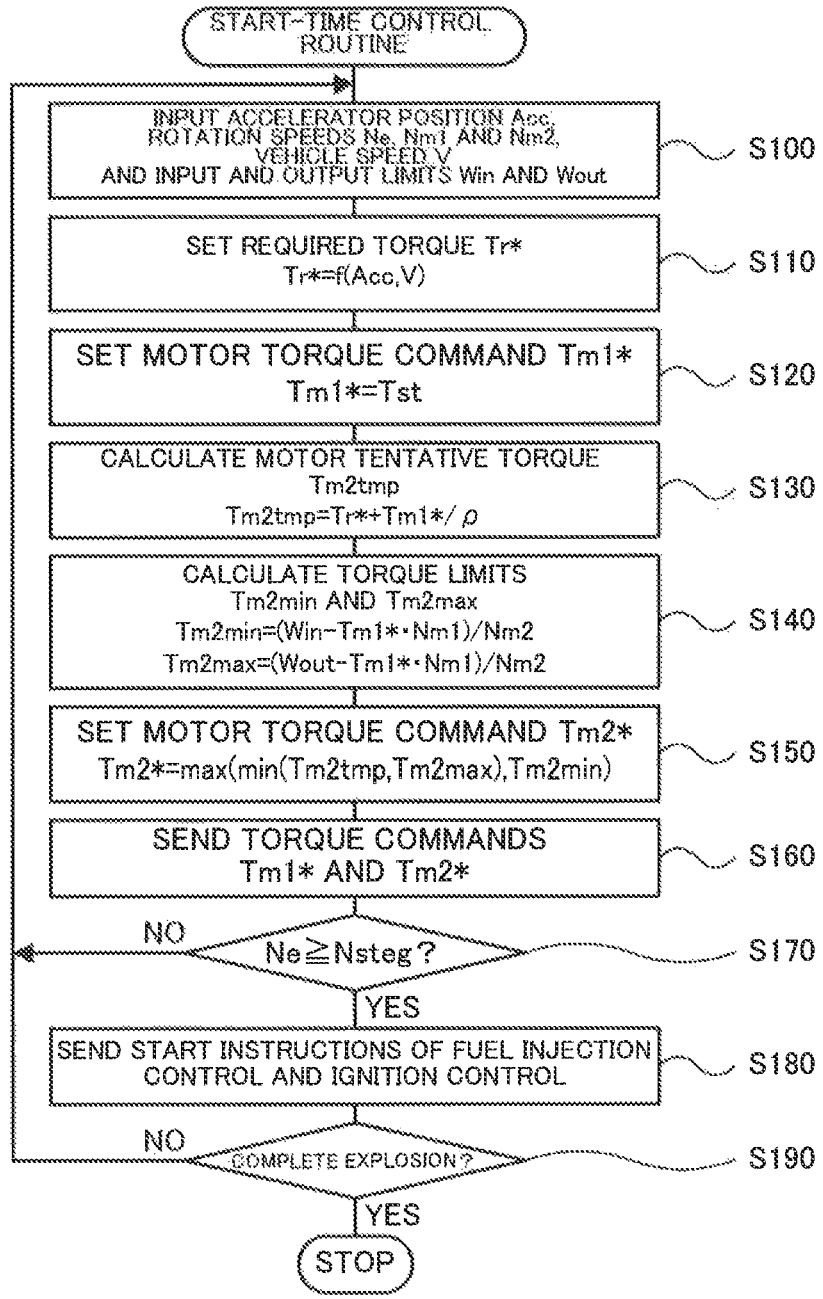
FIG. 2 is a flowchart showing one example of a start-time control routine performed by an HVECU according to the embodiment.

The following describes the operations of the hybrid vehicle 20 of the embodiment having the configuration described above or more specifically the operations to crank and start the engine 22 by the motor MG1. FIG. 2 is a flowchart showing one example of a start-time control routine performed by the HVECU 70 of the embodiment. This routine is performed when the start condition of the engine 22 is satisfied during a run in the EV drive mode.

On start of the start-time control routine, the HVECU 70 first inputs data required for control, for example, the accelerator position Acc, the vehicle speed V, the rotation speed Ne of the engine 22, the rotation speeds Nm1 and Nm2 of the motors MG1 and MG2 and the input and output limits Win and Wout of the battery 50 (step S100). The accelerator position Acc input here is the value detected by the accelerator pedal position sensor 84. The vehicle speed V input here is the value detected by the vehicle speed sensor 88. The rotation speed Ne of the engine 22 is the value that is computed based on the crank angle θcr of the engine 22 from the crank position sensor 23 and is input from the engine ECU 24 by communication. The rotation speeds Nm1 and Nm2 of the motors MG1 and MG2 are the values that are computed based on the rotational positions θm1 and θm2 of the rotors of the motors MG1 and MG2 from the rotational position detection sensors 43 and 44 and are input from the motor ECU 40 by communication. The input and output limits Win and Wout of the battery 50 are the values that are set based on the battery temperature Tb of the battery 50 from the temperature sensor 51c and the state of charge SOC of the battery 50 based on the battery current Ib of the battery 50 from the current sensor 51b and are input from the battery ECU 52 by communication.

Figure 3:
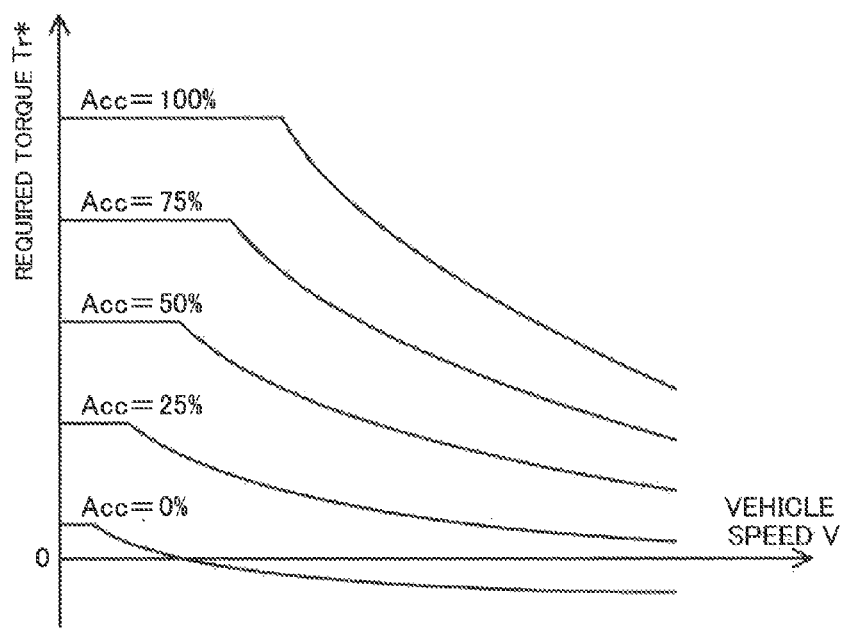
FIG. 3 is a diagram illustrating one example of a relationship between vehicle speed V and required torque Tr* with regard to various accelerator positions Acc.

After inputting the data, the HVECU 70 sets a required torque Tr* required for driving (to be output to the driveshaft 36), based on the input accelerator position Acc and the input vehicle speed V (step S110). According to this embodiment, a procedure of setting the required torque Tr* specifies and stores in advance a relationship between the vehicle speed V and the required torque Tr* with regard to various accelerator positions Acc in the form of a map in the ROM (not shown), and reads and sets the required torque Tr* corresponding to a given accelerator position Acc and a given vehicle speed V from this map. One example of the relationship between the vehicle speed V and the required torque Tr* with regard to various accelerator positions Acc is shown in FIG. 3.

The HVECU 70 subsequently sets a cranking torque Tst for cranking the engine 22 to a torque command Tm1* of the motor MG1 (step S120). The cranking torque Tst used here is a value set by a cranking torque setting routine described later.

Figure 4:
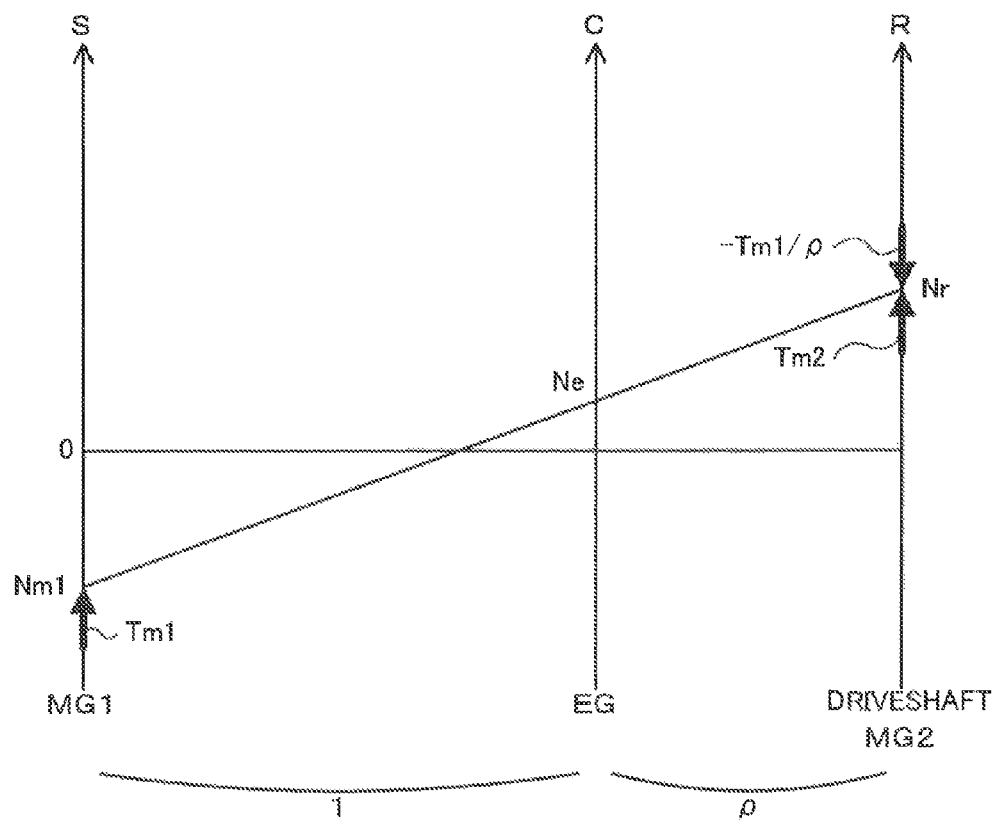
FIG. 4 is a chart illustrating one example of a collinear diagram that shows a dynamic relationship between rotation speed and torque with regard to rotational elements of a planetary gear when an engine is cranked and started by a motor MG1.

The HVECU 70 subtracts a torque that is output from the motor MG1 and is applied to the driveshaft 36 via the planetary gear 30 in the state that the motor MG1 is driven with the torque command Tm1*, from the required torque Tr*, so as to calculate a tentative torque Tm2tmp that is a provisional value of a torque command Tm2* of the motor MG2, according to Equation (1) given below (step S130). The HVECU 70 subsequently divides differences between the input and output limits Win and Wout of the battery 50 and power consumption (power generation) of the motor MG1, which is obtained by multiplying the torque command Tm1* of the motor MG1 by the current rotation speed Nm1, by the rotation speed Nm2 of the motor MG2, so as to calculate torque limits Tm2min and Tm2max as upper and lower limits of torque allowed to be output from the motor MG2, according to Equations (2) and (3) given below (step S140). The HVECU 70 then limits the tentative torque Tm2tmp with the torque limits Tm2min and Tm2max to set the torque command Tm2* of the motor MG2, according to Equation (4) given below (step S150). FIG. 4 is a chart illustrating one example of a collinear diagram that shows a dynamic relationship between rotation speed and torque with regard to the rotational elements of the planetary gear 30 when the engine 22 is cranked and started by the motor MG1. In the diagram, axis S on the left side shows the rotation speed of the sun gear that is equal to the rotation speed Nm1 of the motor MG1; axis C shows the rotation speed of the carrier that is equal to the rotation speed Ne of the engine 22; and axis R shows the rotation speed Nr of the ring gear that is equal to the rotation speed Nm2 of the motor MG2. Two thick arrows on the axis R indicate a torque that is output from the motor MG1 and is applied to a ring gear shaft 32a via the planetary gear 30 and a torque that is output from the motor MG2 and is applied to the driveshaft 36. Equation (1) is readily introduced from this collinear diagram.

$$Tm2tmp = Tr^* + Tm1^*/\rho \quad (1)$$

$$Tm2min = (Win - Tm1^* \cdot Nm1)/Nm2 \quad (2)$$

$$Tm2max = (Wout - Tm1^* \cdot Nm1)/Nm2 \quad (3)$$

$$Tm2^* = max(min(Tm2tmp, Tm2max), Tm2min) \quad (4)$$

After setting the torque commands Tm1* and Tm2* of the motors MG1 an MG2, the HVECU 70 sends the set torque commands Tm1* and Tm2* of the motors MG1 and MG2 to the motor ECU 40 (step S160). When receiving the torque commands Tm1* and Tm2* of the motors MG1 and MG2, the motor ECU 40 performs switching control of the switching elements of the inverters 41 and 42 to drive the motors MG1 and MG2 with the torque commands Tm1* and Tm2*.

The HVECU 70 subsequently compares the rotation speed Ne of the engine 22 with a drive start rotation speed Nsteg (step S170). The drive start rotation speed Nsteg denotes a rotation speed for starting the operation of the engine 22 (fuel injection control and ignition control) and may be, for example, 1000 rpm or 1200 rpm.

When the rotation speed Ne of the engine 22 is lower than the drive start rotation speed Nsteg, the HVECU 70 goes back to step S100 and repeats the processing of steps S100 to S170. When the rotation speed Ne of the engine 22 becomes equal to or higher than the drive start rotation speed Nsteg, the HVECU 70 sends start instructions of fuel injection control and ignition control of the engine 22 to the engine ECU 24 (step S180). When receiving the start instructions, the engine ECU 24 starts the fuel injection control and the ignition control of the engine 22.

The HVECU 70 then determines whether the engine 22 falls into the state of complete explosion (step S190). When the engine 22 has not yet fallen into the state of complete explosion, the HVECU 70 goes back to step S100 and repeats the processing of steps S100 to S190. When the engine 22 falls into the state of complete explosion, this routine is terminated.

Figure 5:
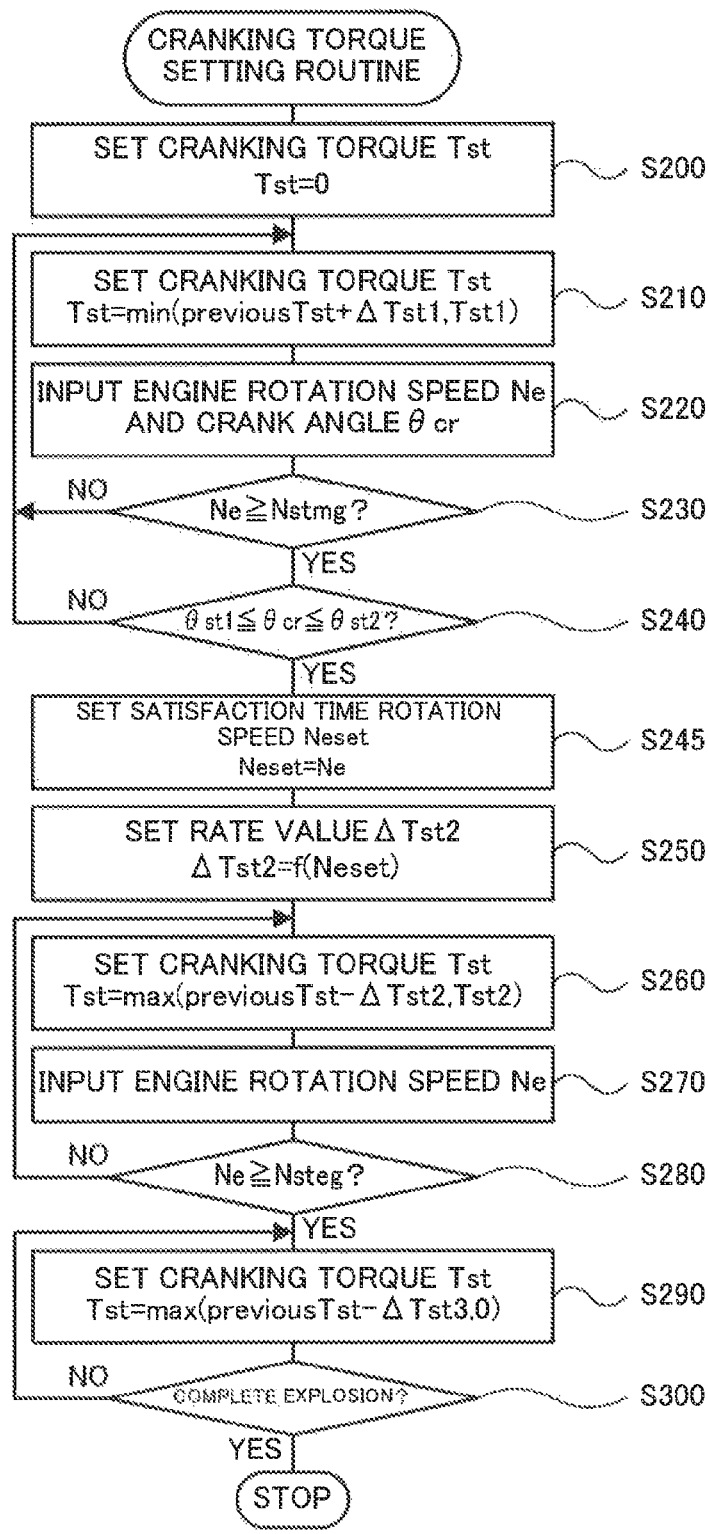
FIG. 5 is a flowchart showing one example of a cranking torque setting routine performed by the HVECU according to the embodiment.

The following describes a process of setting the cranking torque Tst used at step S120 in the above start-time control routine. FIG. 5 is a flowchart showing one example of a cranking torque setting routine performed by the HVECU 70 according to the embodiment. This routine is performed concurrently with the start-time control routine of FIG. 2 when the start condition of the engine 22 is satisfied during a run in the EV drive mode.

On start of the cranking torque setting routine, the HVECU 70 first sets value 0 to the cranking torque Tst (step S200). The HVECU 70 subsequently limits the sum of a previously set cranking torque (previous Tst) and a rate value ΔTst1 with a relatively large specified torque Tst1 in a positive range (in the direction of increasing the rotation speed Ne of the engine 22) (upper limit guarding) to set the cranking torque Tst, according to Equation (5) given below (step S210). The specified torque Tst1 denotes a maximum value of the cranking torque Tst and is set to a torque for rapidly increasing the rotation speed Ne of the engine 22. The rate value ΔTst1 denotes a rate value for increasing the cranking torque Tst from the value 0.

$$Tst = min(previous\ Tst + \Delta Tst1, Tst1) \quad (5)$$

The HVECU 70 subsequently inputs the rotation speed Ne and the crank angle θcr of the engine 22 (step S220). The crank angle θcr of the engine 22 is the value that is detected by the crank position sensor 23 and is input from the engine ECU 24 by communication. The rotation speed Ne of the engine 22 is the value that is computed based on the crank angle θcr of the engine 22 and is input from the engine ECU 24 by communication. The embodiment employs the four-cylinder engine 22, so that the crank angle θcr is expressed in the range of −90° to 90° (repetitively changed in this range) on the assumption that the top dead center of the compression stroke in each cylinder of the engine 22 is set to 0°.

After inputting the rotation speed Ne and the crank angle θcr of the engine 22, the HVECU 70 determines whether a predetermined condition is satisfied using the rotation speed and the crank angle θcr of the engine 22 (steps S230 and S240). The predetermined condition denote a condition used to determine whether it is the timing to start decreasing the cranking torque Tst from the specified torque Tst1. According to this embodiment, the HVECU 70 determines that the predetermined condition is satisfied when both a rotation speed condition that the rotation speed Ne of the engine 22 is equal to or higher than a predetermined rotation speed Nstmg and a crank angle condition that the crank angle θcr of the engine 22 is in a predetermined range of θst1 to θst2 are met. The HVECU 70 determines that the predetermined condition is satisfied when at least one of the rotation speed condition and the crank angle condition is not met, and goes back to step S210.

The processing of steps S210 to S240 waits for satisfying the predetermined condition, while increasing the cranking torque Tat from the value 0 to the specified torque Tst1 and keeping the cranking torque Tst at the specified torque Tst1 by the rate process using the rate value ΔTst1. According to this embodiment, the predetermined range of θst1 to θst2 is a range specified in advance by experiment or by analysis such that the maximum vibration becomes equal to or lower than allowable upper limit vibration when the torque of the motor MG1 (cranking torque Tst) starts decreasing in the state that the rotation speed Ne of the engine 22 is equal to or higher than the predetermined rotation speed Nstmg. The predetermined rotation speed Nstmg may be, for example, 300 rpm, 350 rpm or 400 rpm. The predetermined range of θst1 to θst2 may be for example, a range of 50°, 55° or 60° to 70°, 75° or 80°. The configuration of this embodiment determines whether the predetermined condition is satisfied using both the rotation speed condition and the crank angle condition. This configuration suppresses the occurrence of significantly large vibration when the torque of the motor MG1 (cranking torque Tst) starts decreasing from the specified torque Tst1, compared with the configuration of determining whether the predetermined condition is satisfied using only the rotation speed condition.

Figure 6:
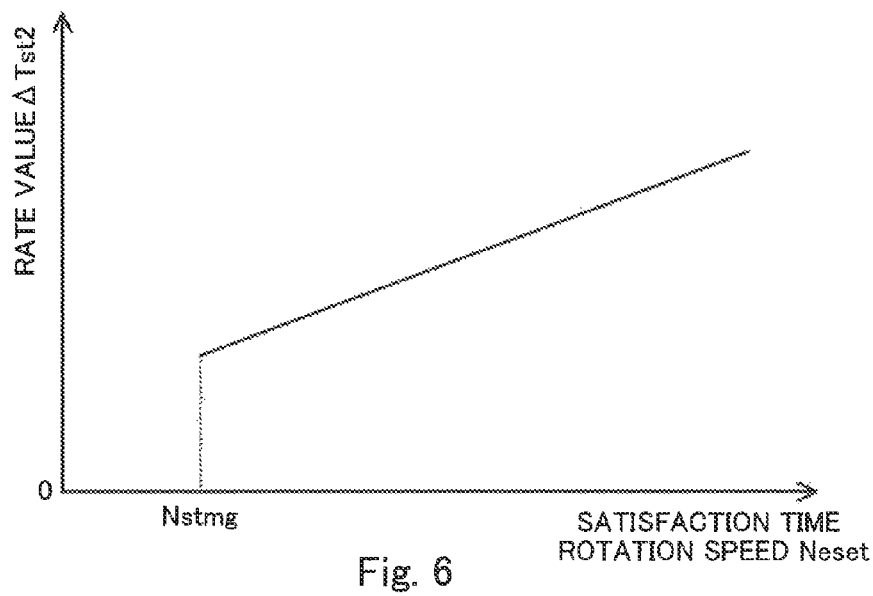
FIG. 6 is a diagram illustrating one example of a relationship between satisfaction time rotation speed Neset and rate value ΔTst2.

When the predetermined condition is satisfied in the course of repeating the processing of steps S210 to S240, the HVECU 70 sets the rotation speed Ne of the engine 22 at the time when the predetermined condition is satisfied to a satisfaction time rotation speed Neset (step S245). The HVECU 70 subsequently sets a rate value ΔTst2 based on the satisfaction time rotation speed Neset (step S250). The rate value ΔTst2 denotes a rate value for decreasing the cranking torque Tst from the specified torque Tst1. According to this embodiment, a procedure of setting the rate value ΔTst2 specifies and stores in advance a relationship between the satisfaction time rotation speed Neset and the rate value ΔTst2 in the form of a map in the ROM (not shown) and reads the rate value ΔTst2 corresponding to a given satisfaction time rotation speed Neset from this map. One example of the relationship between the satisfaction time rotation speed Neset and the rate value ΔTst2 is shown in FIG. 6. As illustrated, the rate value ΔTst2 is set to increase with an increase in satisfaction time rotation speed Neset. The reason of such setting will be described later.

The HVECU 70 subsequently limits the result of subtraction of the rate value ΔTst2 from the previously set cranking torque (previous Tst) with a specified torque Tst2 that is smaller than the specified torque Tst1 in the positive range (lower limit guarding) to set the cranking torque Tst, according to Equation (6) given below (step S260). The specified torque Tst2 denotes a torque for increasing the rotation speed Ne of the engine 22 to or above the drive start rotation speed Nsteg, while suppressing an increase in power consumption by the motor MG1.

$$Tst=\max(\text{previous } Tst-\Delta Tst2, Tst2) \tag{6}$$

The HVECU 70 subsequently inputs the rotation speed Ne of the engine 22 (step S270) and determines whether the rotation speed Ne of the engine 22 is equal to or higher than the drive start rotation speed Nsteg (step S280). When the rotation speed Ne of the engine 22 is lower than the drive start rotation speed Nsteg, the HVECU 70 goes back to step S260. The processing of steps S260 to S280 waits for increasing the rotation speed Ne of the engine 22 to or above the drive start rotation speed Nsteg, while decreasing the cranking torque Tst from the specified torque Tst1 to the specified torque Tst2 and keeping the cranking torque Tst at the specified torque Tst2 by the rate process using the rate value ΔTst2.

When the rotation speed Ne of the engine 22 increases to or above the drive start rotation speed Nsteg in the course of repeating the processing of steps S260 to S280, the HVECU 70 limits the result of subtraction of a rate value ΔTst3 from the previously set cranking torque (previous Tst) with value 0 (lower limit guarding) to set the cranking torque Tst, according to Equation (7) given below (step S290). The rate value ΔTst3 denotes a rate value for decreasing the cranking torque Tst from the specified torque Tst2.

$$Tst=\max(\text{previous } Tst-\Delta Tst3, 0) \tag{7}$$

The HVECU 70 then determines whether the engine 22 falls into the state of complete explosion (step S300). When the engine 22 has not yet fallen into the state of complete explosion, the HVECU 70 goes back to step S290. The processing of steps S290 and S300 waits for the engine 22 falling into the state of complete explosion, while decreasing the cranking torque Tst from the specified torque Tst2 to the value 0 and keeping the cranking torque Tst at the value 0 by the rate process using the rate value ΔTst3. When the engine 22 falls into the state of complete explosion in the course of repeating the processing of steps S290 and S300, this routine is terminated.

The following describes the reason why the rate value ΔTst2 is set to increase with an increase in satisfaction time rotation speed Neset at step S250. In the process of cranking and starting the engine 22 by the motor MG1, the time period between start of cranking the engine 22 by the motor MG1 and satisfaction of the predetermined condition (hereinafter referred to as early part of starting time period) and the rotation amount of the engine 22 (number of strokes of intake, compression, expansion and exhaust, i.e., total emission) in the early part of starting time period are varied according to the crank angle θcr and the temperature (friction) of the engine 22 at the start time of starting the engine 22.

On the assumption that the rate value ΔTst2 is a fixed value, the above variations in the early part of starting time period leads to variations of the time period between start of cranking the engine 22 by the motor MG1 and completion of starting the engine 22 (hereinafter referred to as entire starting time period) and the rotation amount of the engine 22 in the entire starting time period. This is likely to cause deterioration of drivability (acceleration performance) and emission.

For example, it is assumed that a relatively small fixed value is used as the rate value ΔTst2 (gradually decreasing the magnitude of the cranking torque Tst) and that the satisfaction time rotation speed Neset is a high rotation speed. The high satisfaction time rotation speed Neset basically provides the large rotation amount of the engine 22 in the early part of starting time period. Using the relatively small rate value ΔTst2 results in further increasing the rotation amount of the engine 22 (total emission) in the entire starting time period and is likely to cause deterioration of emission.

In another example, it is assumed that a relatively large fixed value is used as the rate value ΔTst2 (rapidly decreasing the magnitude of the cranking torque Tst) and that the satisfaction time rotation speed Neset is a low rotation speed. The low satisfaction time rotation speed Neset basically shortens the early part of starting time period. Using the relatively large rate value ΔTst2, however, requires a relatively long time duration for a subsequent increase of the rotation speed Ne of the engine 22. This results in extending the entire starting time period and is likely to cause deterioration of drivability (acceleration performance).

Based on the above discussion, the rate value ΔTst2 is set to increase with an increase in satisfaction time rotation speed Neset according to the embodiment. This suppresses the variations of the entire starting time period and the rotation amount of the engine 22 (total emission) in the entire starting time period. This results in suppressing deterioration of drivability (acceleration performance) and emission.

Figure 7:
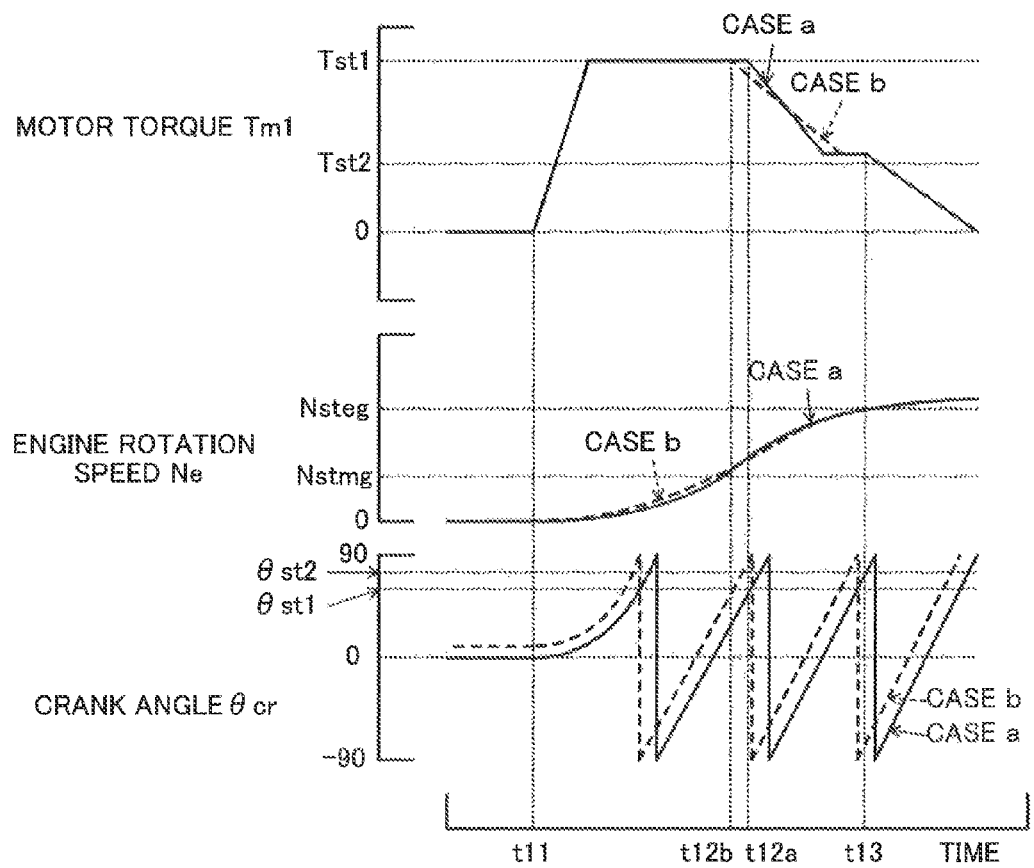
FIG. 7 is a diagram illustrating one example of time changes in torque Tm1 of the motor MG1 and rotation speed Ne and crank angle θcr of the engine in the process of cranking and starting the engine by the motor MG1.

FIG. 7 is a diagram illustrating one example of time changes of the torque Tm1 of the motor MG1 and the rotation speed Ne and the crank angle θcr of the engine 22 in the process of cranking and starting the engine 22 by the motor MG1. In the diagram, solid line curves indicate case a (where the predetermined condition is satisfied at a time t12a), and broken line curves indicate case b (where the predetermined condition is satisfied at a time t12b). As shown by the solid line curves and the broken line curves, when the start condition of the engine 22 is satisfied at a time t11, the rate process using the rate value ΔTst1 is performed to increase the torque Tm1 of the motor MG1 (cranking torque Tst) from the value 0 to the positive specified torque Tst1 and keep the cranking torque Tst at the specified torque Tst1. This results in rapidly increasing the rotation speed Ne of the engine 22. The predetermined condition is satisfied, i.e., the rotation speed Ne of the engine 22 is equal to or higher than the predetermined rotation speed Nstmg and the crank angle θcr of the engine 22 is in the predetermined range of θst1 to θst2, at the time t12a in the case a and at the time t12b in the case b. The rate process using the rate value ΔTst2 is then performed to decrease the torque Tm1 of the motor MG1 from the specified torque Tst1 to the smaller specified torque Tst2 and keep the torque Tm1 at the smaller specified torque Tst2. This results in increasing the rotation speed Ne of the engine 22, while reducing the power consumption of the motor MG1 and decreasing the torque that is output from the motor MG1 and is applied to the driveshaft 36 via the planetary gear 30. When the rotation speed Ne of the engine 22 becomes equal to or higher than the drive start rotation speed Nsteg at a time t13, operations of the engine 22 (fuel injection control and ignition control) are started. Concurrently the rate process using the rate value ΔTst3 is performed to decrease the torque Tm1 of the motor MG1 from the specified torque Tst2 to the value 0 and keep the torque Tm1 at the value 0. When the engine 22 falls into the state of complete explosion, the starting process of the engine 22 is completed and the hybrid vehicle 20 starts running in the HV drive mode. According to this embodiment, the rate value ΔTst2 is set to increase with an increase in satisfaction time rotation speed Nest (i.e., the rotation speed Ne of the engine 22 at the time t12a or at the time t12b). This suppresses variations of the entire starting time period (i.e., the time duration from the time t11 to the time t13) and the rotation amount of the engine 22 (total emission) in the entire starting time period. This results in suppressing deterioration of drivability (acceleration performance) and emission.

The hybrid vehicle 20 of the embodiment described above controls the motor MG1 in the following manner in the process of cranking and starting the engine 22 by the motor MG1. Until the predetermined condition is satisfied, i.e., until the rotation speed Ne of the engine 22 is equal to or higher than the predetermined rotation speed Nstmg and the crank angle θcr of the engine 22 is in the predetermined range of θst1 to θst2, the motor MG1 is controlled to increase the torque of the motor MG1 from the value 0 to the positive specified torque Tst1 and keep the torque of the motor MG1 at the specified torque Tst1 by the rate process using the rate value ΔTst1. After the predetermined condition is satisfied, the motor MG1 is controlled to decrease the torque of the motor MG1 from the specified torque Tst1 by the rate process using the rate value ΔTst2. In this control of the motor MG1, the rate value ΔTst2 is set to increase with an increase in satisfaction time rotation speed Nest that denotes the rotation speed Ne of the engine 22 when the predetermined condition is satisfied. This suppresses variations of the entire starting time period and the rotation amount of the engine 22 (total emission) in the entire starting time period. This results in suppressing deterioration of drivability (acceleration performance) and emission.

The hybrid vehicle 20 of the embodiment performs the cranking torque setting routine of FIG. 5 to crank and start the engine 22 by the motor MG1. According to modifications, one of cranking torque setting routines of FIG. 8 to FIG. 10 may be performed alternatively. The following sequentially describes these modified cranking torque setting routines.

Figure 8:
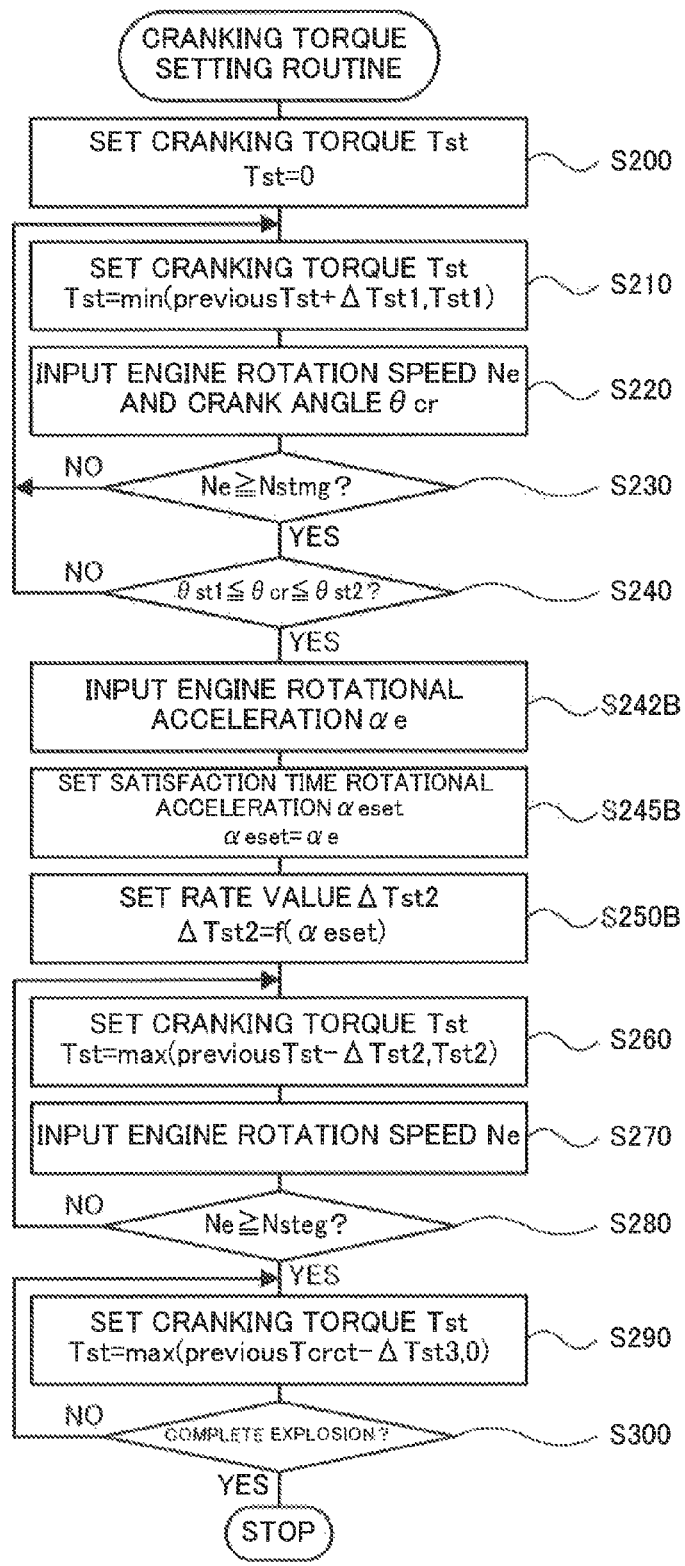
FIG. 8 is a flowchart showing another example of the cranking torque setting routine according to a modification.

The routine of FIG. 8 is described. The routine of FIG. 8 is similar to the routine of FIG. 5 except addition of step S242B and replacement of steps S245 and S250 in the routine of FIG. 5 with steps S245B and S250B. The like processes in the routine of FIG. 8 to those in the routine of FIG. 5 are expressed by the like step numbers and their detailed description is omitted.

Figure 11:
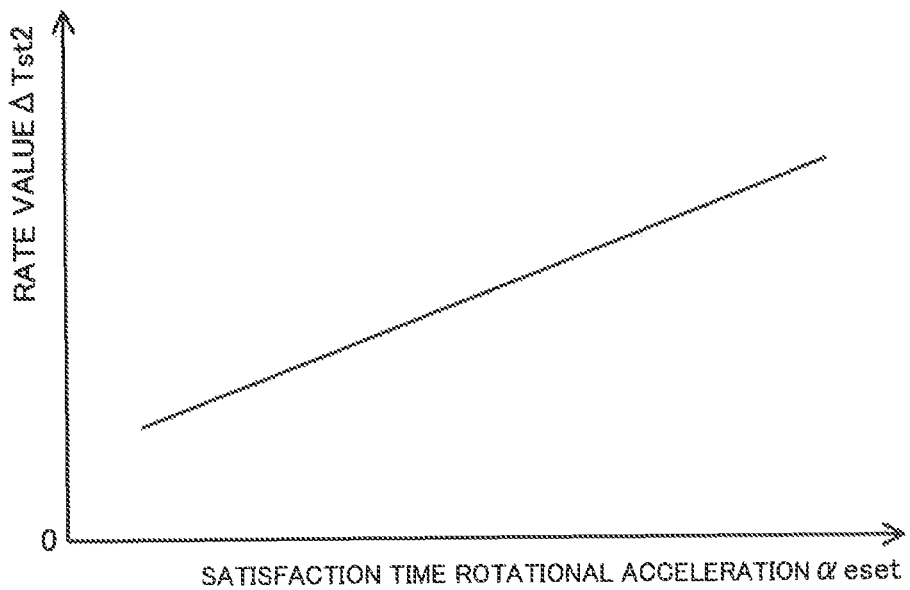
FIG. 11 is a diagram illustrating one example of a relationship between satisfaction time rotational acceleration αeset and rate value ΔTst2.

In the routine of FIG. 8, when the predetermined condition is satisfied in the course of repeating the processing of steps S210 to S240 after the processing of step S200, the HVECU 70 inputs a rotational acceleration αe of the engine 22 (step S242B) and sets the input rotational acceleration αe of the engine 22 (rotational acceleration αe of the engine 22 when the predetermined condition is satisfied) to a satisfaction time rotational acceleration αeset (step S245B). The HVECU 70 subsequently sets a rate value ΔTst2 based on the satisfaction time rotational acceleration αeset (step S250B) and performs the processing of and after step S260. The rotational acceleration αe of the engine 22 is the value computed from the current value and the previous value of the rotation speed Ne of the engine 22. According to this modification, a procedure of setting the rate value ΔTst2 specifies and stores in advance a relationship between the satisfaction time rotational acceleration αeset and the rate value ΔTst2 in the form of a map in the ROM (not shown) and reads the rate value ΔTst2 corresponding to a given satisfaction time rotational acceleration αeset from this map. One example of the relationship between the satisfaction time rotational acceleration αeset and the rate value ΔTst2 is shown in FIG. 11. As illustrated, the rate value ΔTst2 is set to increase with an increase in satisfaction time rotational acceleration αeset. This is based on that the higher satisfaction time rotational acceleration αeset is likely to provide the higher satisfaction time rotation speed Neset and that the rate value ΔTst2 is set to increase with an increase in satisfaction time rotation speed Neset according to the above embodiment. Like the above embodiment, setting the rate value ΔTst2 in this manner suppresses the variations of the entire starting time period and the rotation amount of the engine 22 (total emission) in the entire starting time period. This results in suppressing deterioration of drivability (acceleration performance) and emission.

Figure 9:
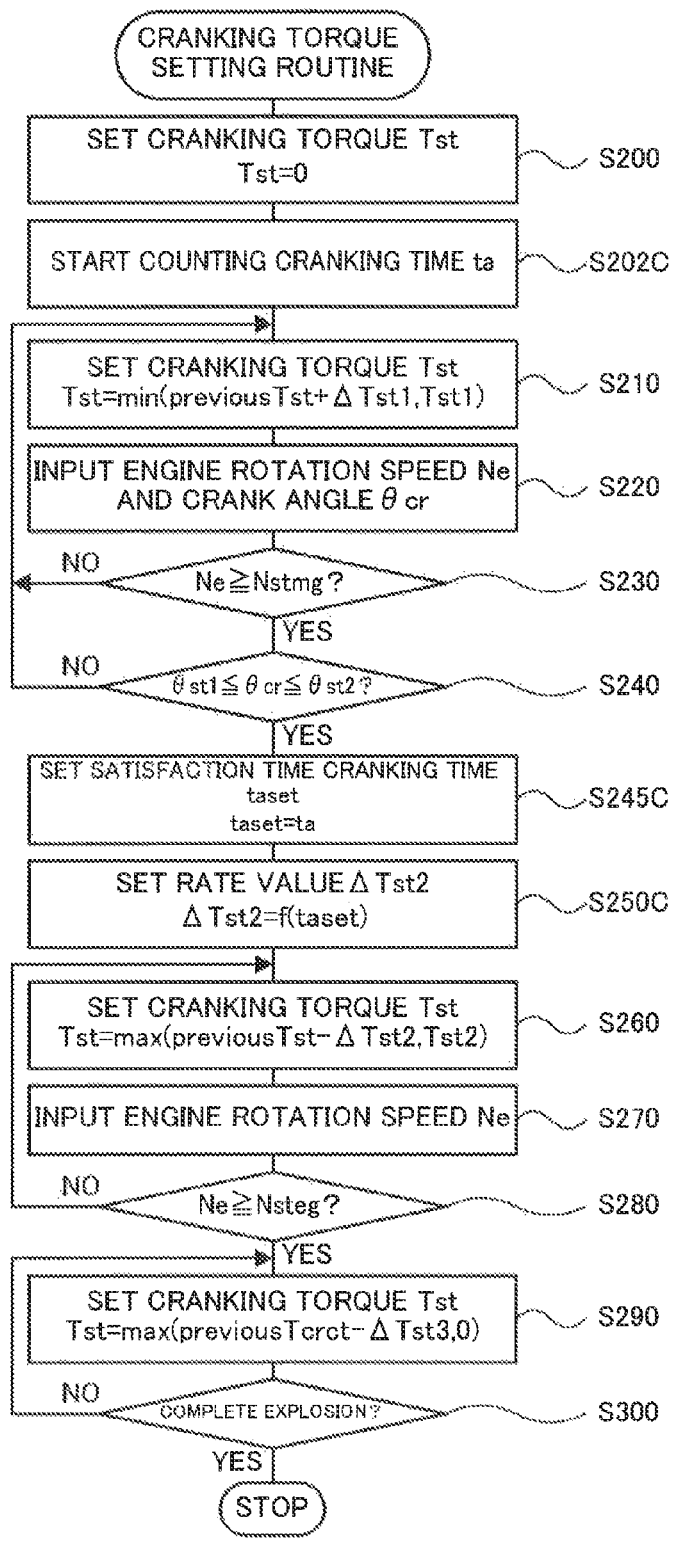
FIG. 9 is a flowchart showing another example of the cranking torque setting routine according to another modification.

The routine of FIG. 9 is described. The routine of FIG. 9 is similar to the routine of FIG. 5 except addition of step S202C and replacement of steps S245 and S250 in the routine of FIG. 5 with steps S245C and S250C. The like processes in the routine of FIG. 9 to those in the routine of FIG. 5 are expressed by the like step numbers and their detailed description is omitted.

In the routine of FIG. 9, after setting the cranking torque Tst to the value 0 (step S200), the HVECU 70 starts counting a cranking time ta (step S202C). The cranking time ta denotes a time period since cranking the engine 22 by the motor MG1 is started.

Figure 12:
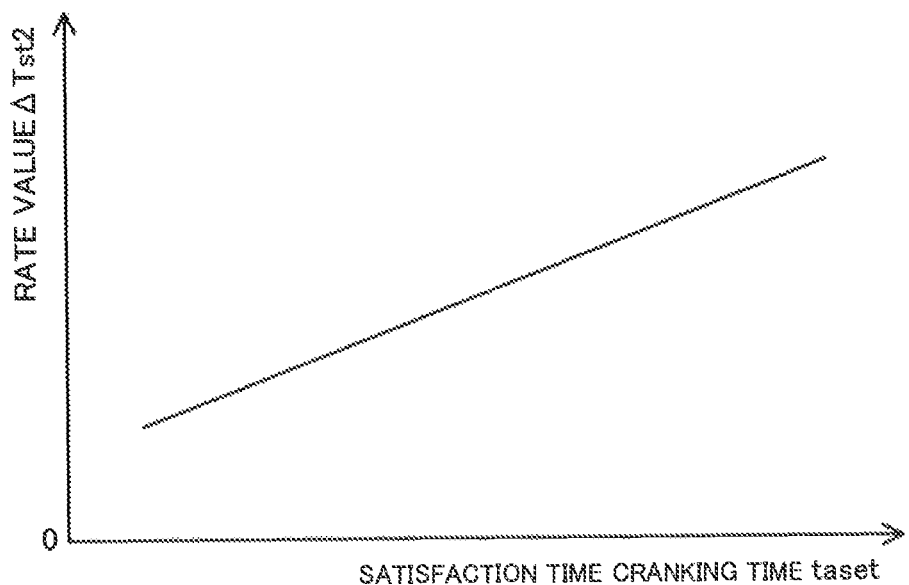
FIG. 12 is a diagram illustrating one example of a relationship between satisfaction time cranking time taset and rate value ΔTst2.

When the predetermined condition is satisfied in the course of repeating the processing of steps S210 to S240, the HVECU 70 sets the cranking time ta on satisfaction of the predetermined condition to a satisfaction time cranking time taset (step S245C). The HVECU 70 subsequently sets a rate value ΔTst2 based on the satisfaction time cranking time taset (step S250C) and performs the processing of and after step S260. According to this modification, a procedure of setting the rate value ΔTst2 specifies and stores in advance a relationship between the satisfaction time cranking time taset and the rate value ΔTst2 in the form of a map in the ROM (not shown) and reads the rate value ΔTst2 corresponding to a given satisfaction time cranking time taset from this map. One example of the relationship between the satisfaction time cranking time taset and the rate value ΔTst2 is shown in FIG. 12. As illustrated, the rate value ΔTst2 is set to increase with an increase in satisfaction time cranking time taset. This is based on that the longer satisfaction time cranking time taset is likely to provide the higher satisfaction time rotation speed Neset and that the rate value ΔTst2 is set to increase with an increase in satisfaction time rotation speed Neset according to the above embodiment. Like the above embodiment, setting the rate value ΔTst2 in this manner suppresses the variations of the entire starting time period and the rotation amount of the engine 22 (total emission) in the entire starting time period. This results in suppressing deterioration of drivability (acceleration performance) and emission.

Figure 10:
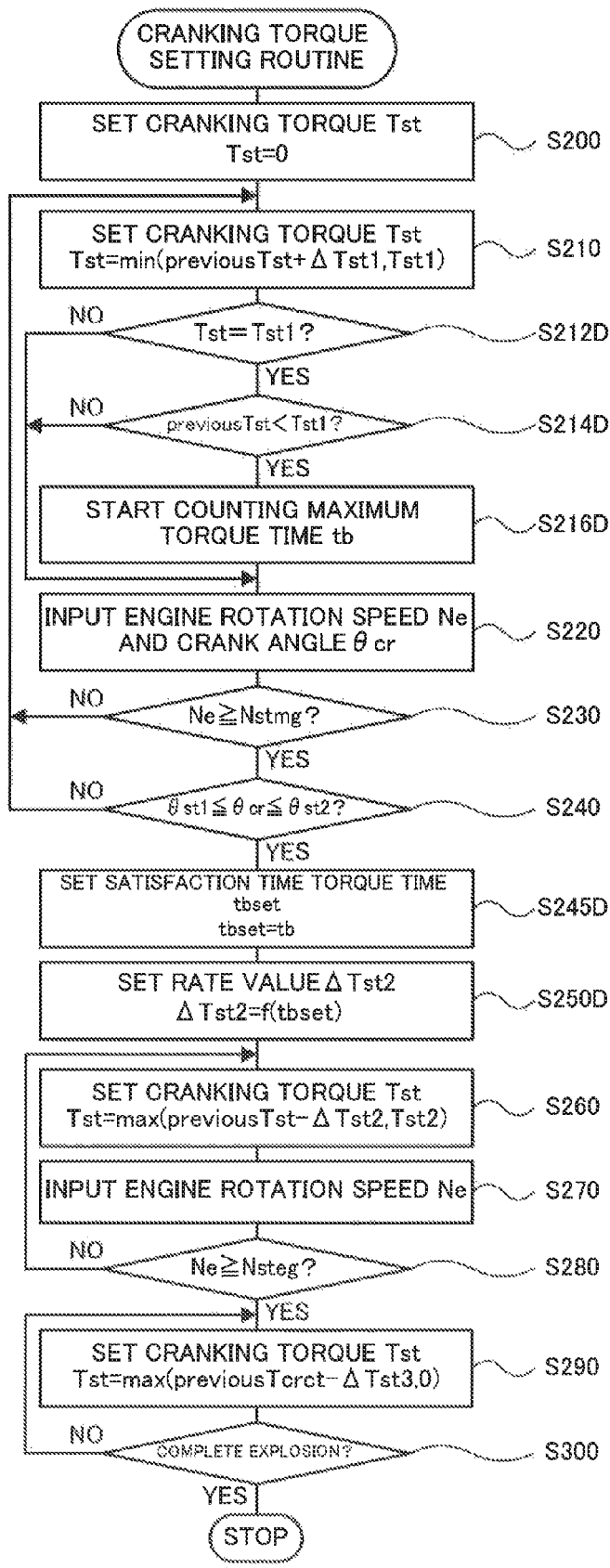
FIG. 10 is a flowchart showing another example of the cranking torque setting routine according to another modification.

The routine of FIG. 10 is described. The routine of FIG. 10 is similar to the routine of FIG. 5 except addition of step S212D to S216D and replacement of steps S245 and S250 in the routine of FIG. 5 with steps S245D and S250D. The like processes in the routine of FIG. 10 to those in the routine of FIG. 5 are expressed by the like step numbers and their detailed description is omitted.

In the routine of FIG. 10, after setting the cranking torque Tst according to Equation (5) given above (step S210), the HVECU 70 determines whether the cranking torque Tst is equal to the specified torque Tst1 and determines whether the previous cranking torque (previous Tst) is smaller than the specified torque Tst1 (steps S212D and S214D). This determines whether it is immediately after the time when the cranking torque Tst reaches the specified torque Tst1.

When the cranking torque Tst is equal to the specified torque Tst1 and the previous cranking torque (previous Tst) is smaller than the specified torque Tst1, the HVECU 70 determines that it is immediately after the time when the cranking torque Tst reaches the specified torque Tst1. The HVECU 70 then starts counting a maximum torque time tb (step S216D) and performs the processing of and after step S220. The maximum torque time tb denotes a time period since start of outputting the specified torque Tst1 (maximum value of the cranking torque Tst) from the motor MG1.

When the cranking torque Tst is smaller than the specified torque Tst1 at step S212D or when the cranking torque Tst is equal to the specified torque Tst1 at step S212D and the previous cranking torque (previous Tst) is also equal to the specified torque Tst1 at step S214D, the HVECU 70 determines that it is not immediately after the time when the cranking torque Tst reaches the specified torque Tst1. The HVECU 70 then skips the processing of step S216D and performs the processing of and after step S220.

Figure 13:
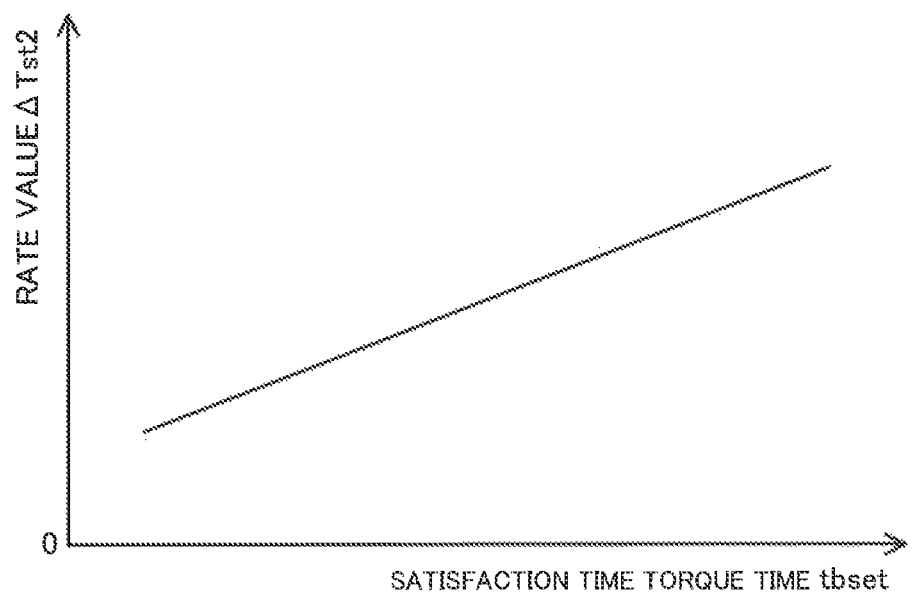
FIG. 13 is a diagram illustrating one example of a relationship between satisfaction time torque time tbset and rate value ΔTst2.

When the predetermined condition is satisfied in the course of repeating the processing of steps S210 to S240, the HVECU 70 sets the maximum torque time tb on satisfaction of the predetermined condition to a satisfaction time torque time tbset (step S245D). The HVECU 70 subsequently sets a rate value ΔTst2 based on the satisfaction time torque time tbset (step S250D) and performs the processing of and after step S260. According to this modification, a procedure of setting the rate value ΔTst2 specifies and stores in advance a relationship between the satisfaction time torque time tbset and the rate value ΔTst2 in the form of a map in the ROM (not shown) and reads the rate value ΔTst2 corresponding to a given satisfaction time torque time tbset from this map. One example of the relationship between the satisfaction time torque time tbset and the rate value ΔTst2 is shown in FIG. 13. As illustrated, the rate value ΔTst2 is set to increase with an increase in satisfaction time torque time tbset. This is based on that the longer satisfaction time torque time tbset is likely to provide the higher satisfaction time rotation speed Neset and that the rate value ΔTst2 is set to increase with an increase in satisfaction time rotation speed Neset according to the above embodiment. Like the above embodiment, setting the rate value ΔTst2 in this manner suppresses the variations of the entire starting time period and the rotation amount of the engine 22 (total emission) in the entire starting time period. This results in suppressing deterioration of drivability (acceleration performance) and emission.

Figure 14:
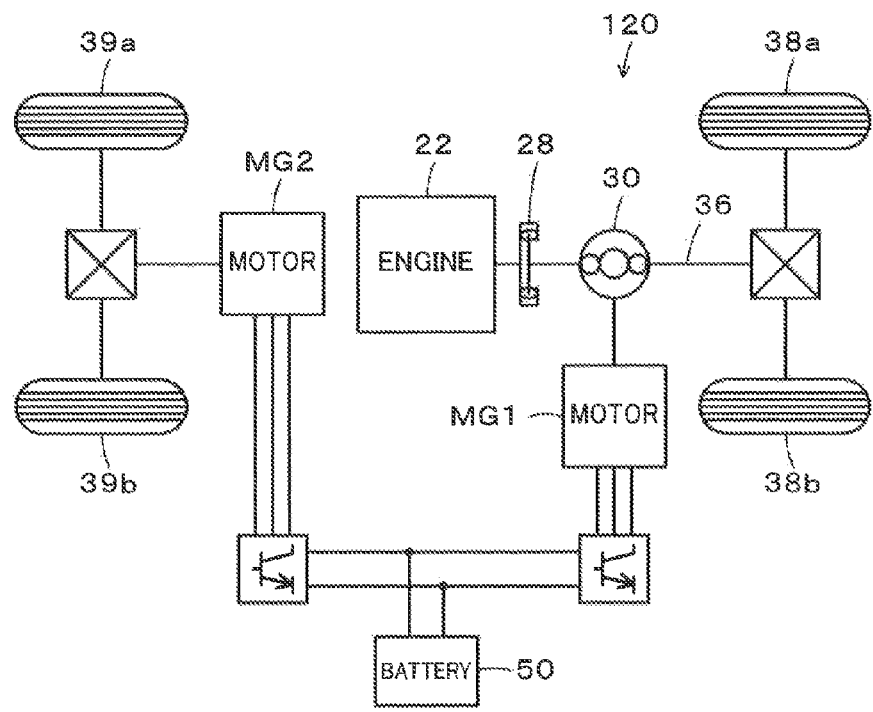
FIG. 14 is a configuration diagram illustrating the schematic configuration of a hybrid vehicle according to a modification.

In the hybrid vehicle 20 of the embodiment, the power from the motor MG2 is output to the driveshaft 36 linked with the drive wheels 38a and 38b. As illustrated in a hybrid vehicle 120 according to one modification shown in FIG. 14, however, the power from the motor MG2 may be output to another axle (axle linked with wheels 39a and 39b shown in FIG. 14) that is different from an axle connected with a driveshaft 36 (i.e., axle linked with drive wheels 38a and 38b).

Figure 15:
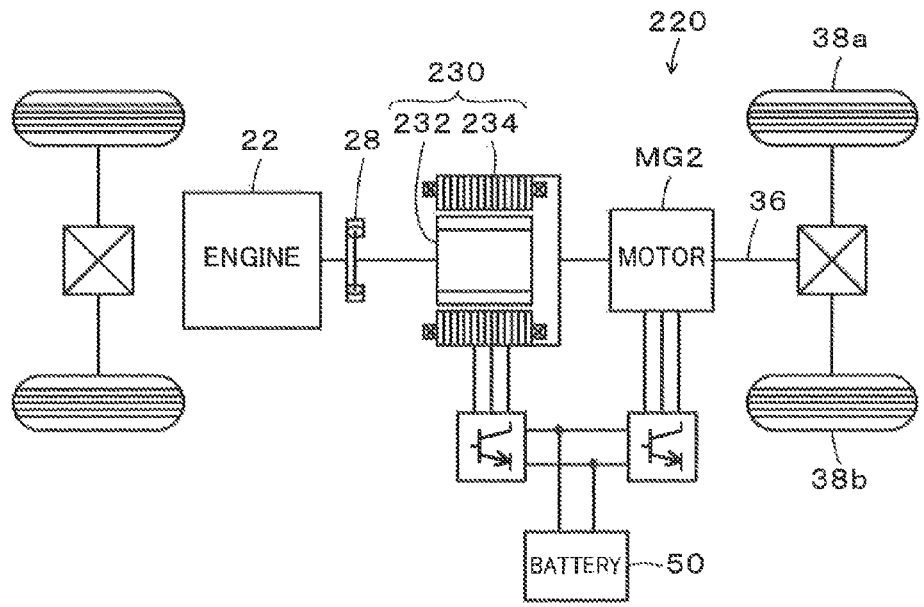
FIG. 15 is a configuration diagram illustrating the schematic configuration of a hybrid vehicle according to another modification.

In the hybrid vehicle 20 of the embodiment, the power from the engine 22 is output via the planetary gear 30 to the driveshaft 36 linked with the drive wheels 38a and 38b. As illustrated in FIG. 15, however, a hybrid vehicle 220 according to another modification may be equipped with a pair-rotor motor 230 that includes an inner rotor 232 connected with a crankshaft of the engine 22 via a damper 28 and an outer rotor 234 connected with a driveshaft 36 linked with drive wheels 38a and 38b. The pair-rotor motor 230 transmits part of the power from the engine 22 to the driveshaft 36, while converting the remaining power to electric power.

Figure 16:
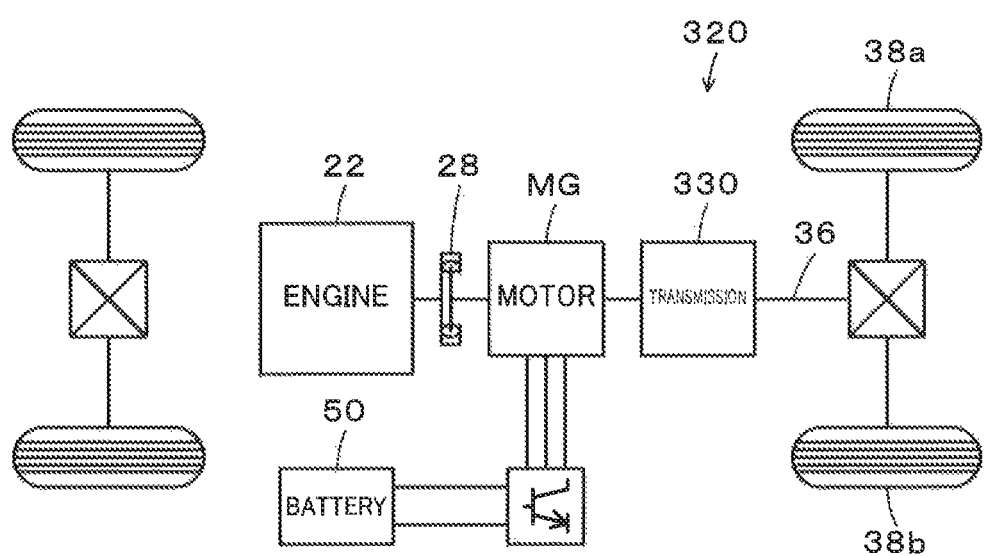
FIG. 16 is a configuration diagram illustrating the schematic configuration of a hybrid vehicle according to another modification.

In the hybrid vehicle 20 of the embodiment, the power from the engine 22 is output via the planetary gear 30 to the driveshaft 36 linked with the drive wheels 38a and 38b, while the power from the motor MG2 is output to the driveshaft 36. As illustrated in a hybrid vehicle 320 according to another modification shown in FIG. 16, however, a motor MG may be connected via a transmission 330 with a driveshaft 36 that is linked with drive wheels 38a and 38b, and an engine 22 may be connected via a damper 28 with a rotating shaft of the motor MG. This configuration causes the power from the engine 22 to be output to the driveshaft 36 via the rotating shaft of the motor MG and the transmission 330, while causing the power from the motor MG to be output to the driveshaft 36 via the transmission 330.

Any of the first, the second and the third hybrid vehicles of the invention may include a planetary gear including three rotational elements that are respectively connected with a driveshaft linked with an axle, an output shaft of the engine and a rotating shaft of the motor, and a second motor that is configured to transmit electric power to and from the battery and input and output power from and to the driveshaft.

The following describes the correspondence relationship between the primary components of the embodiment and the primary components of the invention described in Summary of Invention. The engine 22 of the embodiment corresponds to the "engine"; the motor MG1 corresponds to the "motor"; and the battery 50 corresponds to the "battery". The HVECU 70 performing the start-time control routine of FIG. 2 and the cranking torque setting routine of FIG. 5 and the motor ECU 40 controlling the motor MG1 based on the torque command Tm1* from the HVECU 70 correspond to the "controller".

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention is applicable to, for example, the manufacturing industries of hybrid vehicles.

The invention claimed is:

1. A hybrid vehicle, comprising:
an engine that is configured to have an output shaft that is connected via a torsion element with a downstream shaft linked with an axle;
a motor that is configured to input and output power from and to the downstream shaft;
a battery that is configured to transmit electric power to and from the motor; and
a controller that is configured to, in a process of cranking and starting the engine by the motor, control the motor to increase a torque of the motor from value 0 to a specified torque and keep the torque at the specified torque until a predetermined condition is satisfied that a rotation speed of the engine is equal to or higher than a predetermined rotation speed and a crank angle of the engine is in a predetermined crank angle range, and to control the motor to decrease the torque of the motor from the specified torque after the predetermined condition is satisfied, wherein
after the predetermined condition is satisfied, the controller controls the motor to decrease the torque of the motor at a higher rate with an increase in rotation speed or rotational acceleration of the engine at a time when the predetermined condition is satisfied.

2. The hybrid vehicle according to claim 1, further comprising:
a planetary gear that is configured to have three rotational elements that are respectively connected with a driveshaft linked with an axle, an output shaft of the engine and a rotating shaft of the motor; and
a second motor that is configured to transmit electric power to and from the battery and to input and output power from and to the driveshaft.

3. A hybrid vehicle, comprising:
an engine that is configured to have an output shaft that is connected via a torsion element with a downstream shaft linked with an axle;
a motor that is configured to input and output power from and to the downstream shaft;
a battery that is configured to transmit electric power to and from the motor; and
a controller that is configured to, in a process of cranking and starting the engine by the motor, control the motor to increase a torque of the motor from value 0 to a specified torque and keep the torque at the specified torque until a predetermined condition is satisfied that a rotation speed of the engine is equal to or higher than a predetermined rotation speed and a crank angle of the engine is in a predetermined crank angle range, and to control the motor to decrease the torque of the motor from the specified torque after the predetermined condition is satisfied, wherein
after the predetermined condition is satisfied, the controller controls the motor to decrease the torque of the motor at a higher rate with an increase in time period between start of cranking the engine and satisfaction of the predetermined condition.

4. The hybrid vehicle according to claim 3, further comprising:
a planetary gear that is configured to have three rotational elements that are respectively connected with a driveshaft linked with an axle, an output shaft of the engine and a rotating shaft of the motor; and
a second motor that is configured to transmit electric power to and from the battery and to input and output power from and to the driveshaft.

5. A hybrid vehicle, comprising:
an engine that is configured to have an output shaft that is connected via a torsion element with a downstream shaft linked with an axle;
a motor that is configured to input and output power from and to the downstream shaft;
a battery that is configured to transmit electric power to and from the motor; and
a controller that is configured to, in a process of cranking and starting the engine by the motor, control the motor to increase a torque of the motor from value 0 to a specified torque and keep the torque at the specified torque until a predetermined condition is satisfied that a rotation speed of the engine is equal to or higher than a predetermined rotation speed and a crank angle of the engine is in a predetermined crank angle range, and to control the motor to decrease the torque of the motor from the specified torque after the predetermined condition is satisfied, wherein
after the predetermined condition is satisfied, the controller controls the motor to decrease the torque of the motor at a higher rate with an increase in time period between increase of the torque of the motor to the specified torque and satisfaction of the predetermined condition.

6. The hybrid vehicle according to claim 5, further comprising:
a planetary gear that is configured to have three rotational elements that are respectively connected with a driveshaft linked with an axle, an output shaft of the engine and a rotating shaft of the motor; and
a second motor that is configured to transmit electric power to and from the battery and to input and output power from and to the driveshaft.

\* \* \* \* \*